US012651065B2

(12) United States Patent
Heuser et al.

(10) Patent No.: US 12,651,065 B2
(45) Date of Patent: Jun. 9, 2026

(54) MACHINE LEARNING TECHNIQUES TO GENERATE NEGOTIATION DATA DURING COMPUTING SYSTEM ATTACKS

(71) Applicant: WELLS FARGO BANK, N.A., San Francisco, CA (US)

(72) Inventors: Edward Heuser, Charlotte, NC (US); Jerry Joseph Reynolds, Charlotte, NC (US)

(73) Assignee: Wells Fargo Bank, N.A., San Francisco, CA (US)

(*) Notice: Subject to any disclaimer, the term of this patent is extended or adjusted under 35 U.S.C. 154(b) by 274 days.

(21) Appl. No.: 18/511,640

(22) Filed: Nov. 16, 2023

(65) Prior Publication Data

US 2025/0165601 A1 May 22, 2025

(51) Int. Cl.
*G06F 21/56* (2013.01)
*G06N 20/00* (2019.01)

(52) U.S. Cl.
CPC ........... *G06F 21/566* (2013.01); *G06N 20/00* (2019.01); *G06F 2221/034* (2013.01)

(58) Field of Classification Search
CPC ...... G06F 21/56–567; G06F 2221/034; G06N 20/00
See application file for complete search history.

(56) References Cited

U.S. PATENT DOCUMENTS 7,908,225 B1 3/2011 Bigus et al.
10,540,607 B1* 1/2020 Oldridge ................ G06N 20/00

11,102,244 B1* 8/2021 Jakobsson ............... H04L 51/42
2018/0004941 A1* 1/2018 Reinecke .............. G06F 21/566
2018/0137401 A1* 5/2018 Kumar .................. G06F 16/245
2019/0098040 A1* 3/2019 Newman .............. G06F 21/577
2019/0149575 A1* 5/2019 Bahrs ...................... G06F 21/56
726/22
2019/0172014 A1* 6/2019 Sohn ..................... H04L 51/224
(Continued)

FOREIGN PATENT DOCUMENTS

CN 111861648 A 10/2020
CN 114268473 A 4/2022
(Continued)

OTHER PUBLICATIONS

P. Ryan, et al, "Dynamics of Targeted Ransomware Negotiation," 2022, IEEE Access, vol. 10, pp. 32836-32844, . (Year: 2022).*
(Continued)

*Primary Examiner* — Jonathan A Bui
(74) *Attorney, Agent, or Firm* — Kilpatrick Townsend & Stockton LLP

(57) ABSTRACT

A negotiation evaluation system determines that a target computing system is experiencing a computing system attack. The negotiation evaluation system determines a set of attack characteristics associated with the computing system attack. Based on the set of attack characteristics, a negotiation estimation model generates response value data describing potential responses to the attack. Based on the response value data, a negotiation communication model generates reply text data describing a reply to the computing system attack. The negotiation evaluation system provides the reply text data to a malicious computing system that is associated with the computing system attack.

20 Claims, 4 Drawing Sheets

Computing Environment 100

(56) References Cited

U.S. PATENT DOCUMENTS

| | | | |
|---|---|---|---|
| 2023/0007042 A1* | 1/2023 | Haworth | H04L 63/205 |
| 2023/0018042 A1* | 1/2023 | Koseki | G06F 21/554 |
| 2023/0247062 A1* | 8/2023 | Blankenship | H04L 63/205 |
| | | | 726/1 |
| 2023/0403294 A1* | 12/2023 | Bazalgette | H04L 63/1441 |
| 2024/0089285 A1* | 3/2024 | Jakobsson | H04L 51/212 |
| 2024/0311472 A1* | 9/2024 | Zhang | G06F 21/554 |
| 2025/0039234 A1* | 1/2025 | Southgate | H04L 63/1483 |
| 2025/0094633 A1* | 3/2025 | Wang | G06F 21/6254 |

FOREIGN PATENT DOCUMENTS

| | | |
|---|---|---|
| CN | 114679334 A | 6/2022 |
| KR | 102381277 B1 | 3/2022 |
| WO | 2021216163 A2 | 10/2021 |

OTHER PUBLICATIONS

N. Caporusso, et al, "A Game-Theoretical Model of Ransomware," 2019, AHFE 2018, AISC 782, pp. 69-78 (Year: 2019).*

Vakilinia, et al., "A Mechanism Design Approach to Solve Ransomware Dilemmas", Oct. 2021, 15 pages, Available online at: https://www.researchgate.net/publication/355776293_A_Mechanism_Design_Approach_to_Solve_Ransomware_Dilemmas/link/617fea27a767a03c14dd61d3/download.

Zarabi, "AI Powered Ransomware: Are We Ready?", Port53, Mar. 2, 2023, 10 pages, Available online at: https://port53.com/blog-ai-powered-ransomware/.

Mandiant, "The Power of Mandiant in a Single XDR Platform," Believed to be published at least as early as Oct. 5, 2021, 12 pages, Available online at: https://www.mandiant.com/advantage.

Ransomwatch, "Summary", Believed to be published at least as early as Nov. 27, 2021, 1 page, Available online at: https://ransomwatch.telemetry.ltd/.

No More Ranson, "Need help unlocking your digital life without paying your attackers?", Believed to be published at least as early as Jul. 24, 2016, 8 pages, Available online at: https://www.nomoreransom.org/.

U.S. Securities and Exchange Commission, "SEC Adopts Rules on Cybersecurity Risk Management, Strategy, Governance, and Incident Disclosure by Public Companies," Press Release 2023-139, Jul. 26, 2023, 2 pages, Available online at: https://www.sec.gov/news/press-release/2023-139.

Cybersecurity & Infrastructure Security Agency, "CISA and Partners Update the #StopRansomware Guide, Developed through the Joint Ransomware Task Force (JRTF)", May 23, 2023, 4 pages, Available online at: https://www.cisa.gov/news-events/alerts/2023/05/23/cisa-and-partners-update-stopransomware-guide-developed-through-joint-ransomware-task-force-jrtf.

* cited by examiner

Figure 1

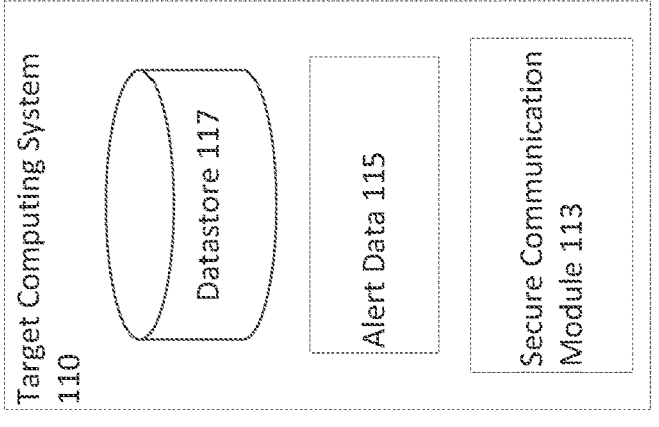

Computing Environment 100

Negotiation Evaluation System 120

Response Value Data 135

Risk Data 145

Reply Text Data 155

Archetype Profile Data 165

Negotiation Estimation Model 130

Risk Estimation Model 140

Negotiation Communication Model 150

Profile Generation Model 160

Computing System Attack Data Repository 105

Attack Characteristics 127

Negotiation Response Data 125

Target Computing System 110

Datastore 117

Alert Data 115

Secure Communication Module 113

Malicious Computing System 190

Communication Text Data 195

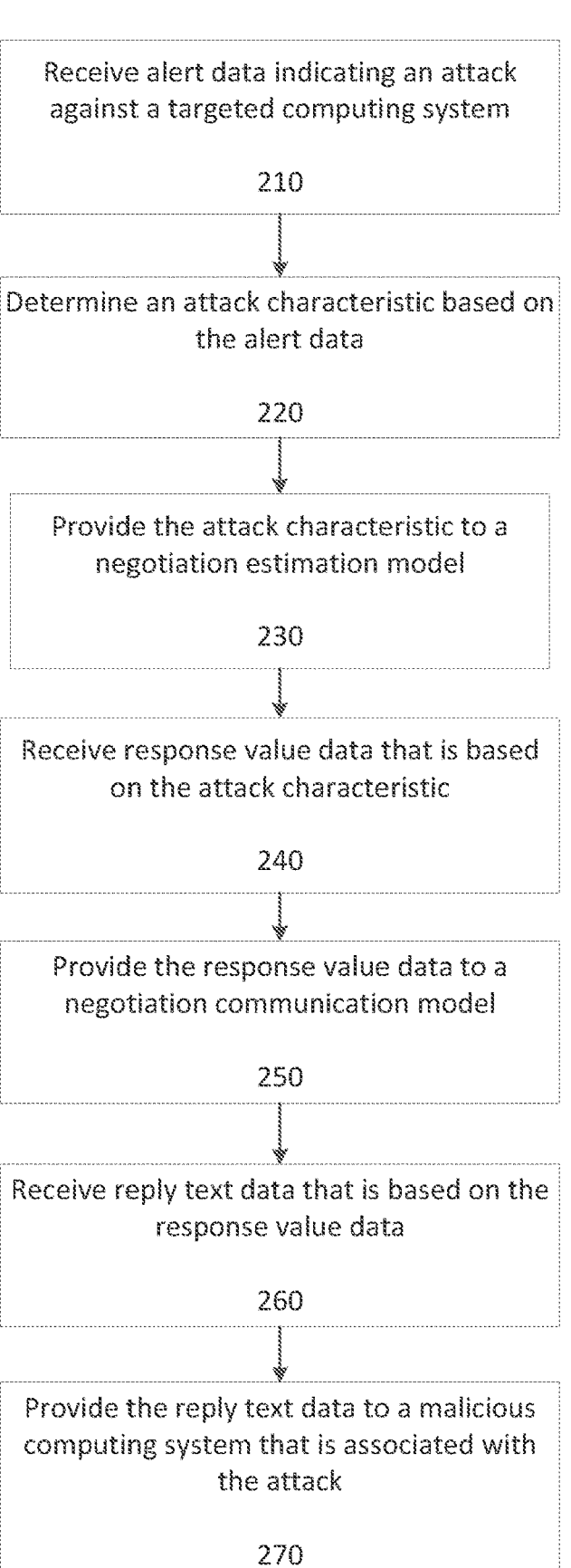

Receive alert data indicating an attack
against a targeted computing system

210

Determine an attack characteristic based on
the alert data

220

Provide the attack characteristic to a
negotiation estimation model

230

Receive response value data that is based
on the attack characteristic

240

Provide the response value data to a
negotiation communication model

250

Receive reply text data that is based on the
response value data

260

Provide the reply text data to a malicious
computing system that is associated with
the attack

270

MACHINE LEARNING TECHNIQUES TO GENERATE NEGOTIATION DATA DURING COMPUTING SYSTEM ATTACKS

TECHNICAL FIELD

This disclosure relates generally to the field of computing system security, and more specifically relates to machine learning techniques for responding to computing system attacks.

BACKGROUND

A rapid increase in ransomware attacks and other types of computing system attacks poses a threat to people and organizations. Contemporary methods of computing system attack negotiation often lack efficiency, speed, and accuracy, leading to prolonged downtimes, larger financial loss, and compromised data integrity. For example, ransomware attacks can involve lockdown of data and computing systems for a targeted individual or organization, resulting in disruption of services for the targeted entity. In addition, malicious parties that perpetrate ransomware attacks may intentionally target individuals or organizations with limited resources, relying on human reactions such as confusion, fear, or inexperience to maximize gain or damage during an attack. A person who is targeted (or is associated with a targeted organization) during a computing system attack may have little or no experience with computing system attacks and may lack information or psychological preparation to effectively deal with the attack. In some cases, human inexperience with computing system attacks can increase negative attack outcomes for the targeted entity, such as computing system downtime, loss off data, or financial loss.

It is desirable to develop an innovative solution to address challenges associated with ransomware and other computing system attacks, such as developing technical tools to assist with negotiation and resolution during a computing system attack. In addition, it is desirable to develop technical tools that utilize artificial intelligence and machine learning, which can assist users in effectively negotiating with malicious parties during a computing system attack.

SUMMARY

According to certain embodiments, a negotiation evaluation system receives alert data indicating a computing system attack against a target computing system. Responsive to receiving the alert data, the negotiation evaluation system determines a set of attack characteristics. The set of attack characteristics describe the computing system attack. The negotiation evaluation system provides the set of attack characteristics to a trained negotiation estimation model and receives response value data from the trained negotiation estimation model. The response value data is determined by the trained negotiation estimation model based on the set of attack characteristics. The negotiation evaluation system provides the response value data to a trained negotiation communication model and receives text data from the trained negotiation communication model. The text data includes a reply to the computing system attack. The reply is determined by the trained negotiation communication model based on the response value data. The negotiation evaluation system provides the text data to a malicious computing system that corresponds to the computing system attack.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where:

FIG. 1 is a block diagram depicting an example of a computing environment in which a negotiation evaluation system generates negotiation response data, according to certain embodiments;

FIG. 2 is a flow chart depicting an example of a process for generating negotiation response data, according to certain embodiments;

DETAILED DESCRIPTION

Figure 3:
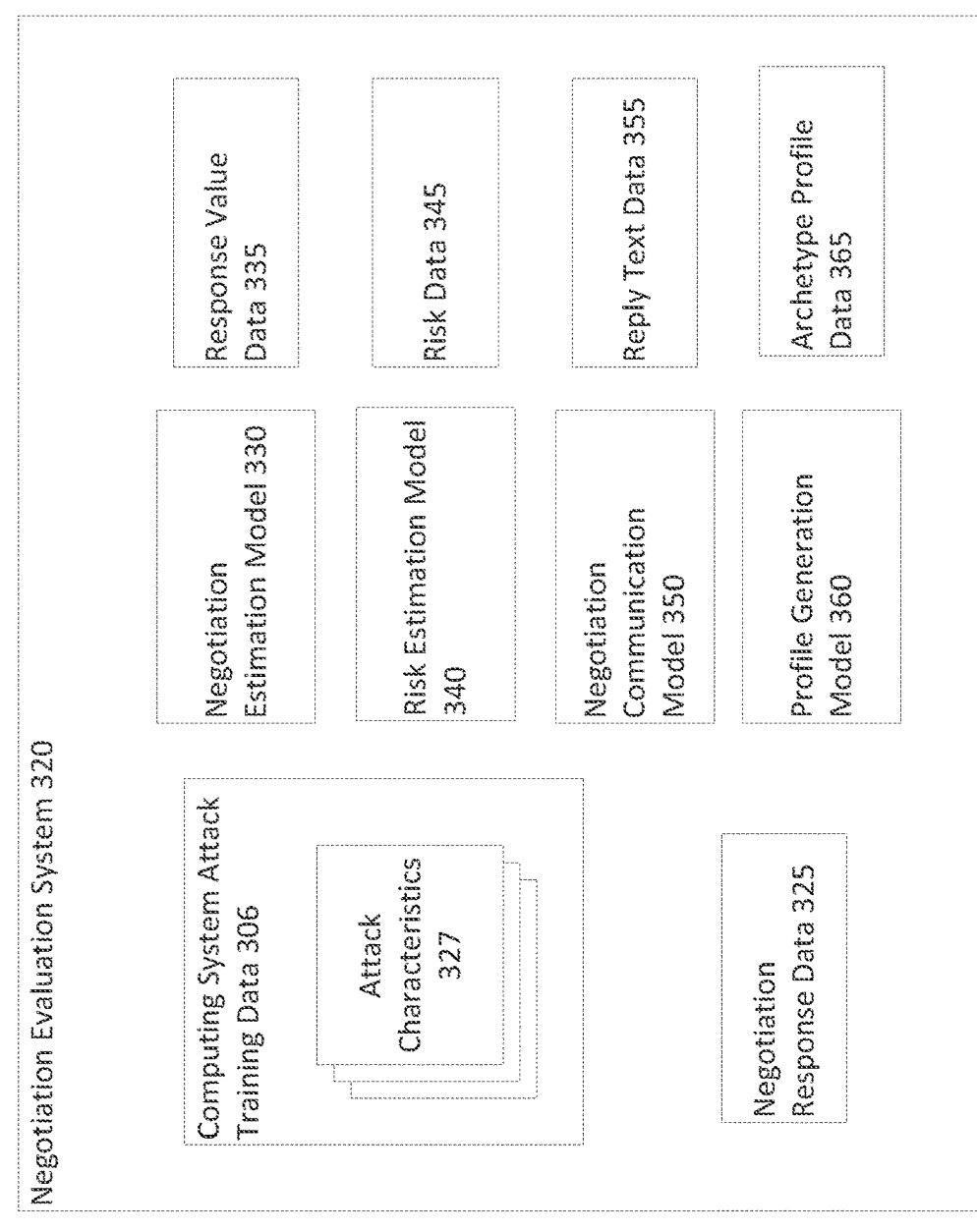
FIG. 3 is a diagram depicting an example of a computing environment in which one or more models of a negotiation evaluation system are trained to generate data, such as portions of negotiation response data, according to certain embodiments.

As discussed above, there is a lack of adequate technical tools to assist a person or organization that is targeted in a computing system attack during negotiation or resolution of the computing system attack. Contemporary approaches for interacting with malicious parties during a computing system attack can be inconsistent and ineffective and may result in negative outcomes for the targeted person or organization. A person who is tasked with representing a targeted entity (such as an individual or an organization) during a computing system attack may be emotionally distressed or inexperienced in resolving computing system attacks. The person might have limited access to, or be unable to accurately interpret, information about the type of attack, a malicious party conducting the attack, or techniques for attack resolution. In addition, the person may inadvertently (e.g., due to inexperience or distress) increase losses or other negative outcomes for the targeted entity, such as loss of data, increased downtime for affected computer systems, sabotage or other damage to affected computing systems, financial loss, or other types of negative outcomes.

In some cases, contemporary technical tools may be inadequate for negotiation or resolution during a computing system attack. For example, some contemporary security tools may provide security for a computing system in advance of a computing system attack, such as to attempt prevention of attacks. However, the example contemporary security tools may fail to provide security during a computing system attack, such as protection for data or other computing system components that are compromised (e.g., locked down, ransomed) during an attack.

Certain embodiments described herein provide techniques to reduce or mitigate negative outcomes during a computing system attack, such as by generating negotiation response data. A negotiation evaluation system can generate negotiation response data based on characteristics of a computing system attack that is targeting a target computing system. For example, the negotiation evaluation system could identify attack characteristics of a ransomware attack that has compromised data of a target computing system. In some cases, attack characteristics can be identified based on alert data describing the attack, data received from the target computing system or another computing system corresponding to a targeted entity, or other sources of information about the attack. In addition, the negotiation evaluation system can generate the negotiation response data based on the attack characteristics. For example, the negotiation evaluation system can include a negotiation estimation model that is configured to generate response value data that is included in the negotiation response data. The negotiation estimation model could calculate data values that describe an estimated efficient response to the example ransomware attack, such as data values that indicate whether negotiation is likely to resolve the attack successfully, a range of potential ransom payments, or other data values that describe an estimated efficient response to the attack. In addition, the negotiation evaluation system can include a negotiation communication model that is configured to generate reply text data that is included in the negotiation response data. The negotiation communication model could generate text data, e.g., natural language text data, that responds to a communication received from a malicious party organizing the example ransomware attack. For example, in response to communication data describing a ransom demand or a threat of additional losses, the negotiation communication model could determine, based on the response value data received from the negotiation estimation model, reply text data that responds to the communication, such as a response indicating a counteroffer identified from the range of potential ransom payments.

In some cases, the response value data, the reply text data, or other types of the negotiation response data could be provided to a user of the negotiation evaluation system, such as a person who is associated with the target computing system. For example, based on the reply text data, the person could identify a course of action (e.g., offer a lower payment, end negotiations) that improves efficiency for resolving the computing system attack. In addition, the negotiation response data can assist the person with understanding an extent or severity of the example ransomware attack. For example, based on a range of potential ransom payments included in the response value data, the person could improve understanding of the estimated value, e.g., to the malicious party organizing the attack, for the compromised data of the target computing system. In addition, based on response value data indicating whether the attack is likely to resolve successfully (e.g., without additional loss to the target computing system), the negotiation evaluation system could provide negotiation response data that describes additional potential attack response options, such as recommendation data describing techniques that could potentially reduce negative outcomes of the attack. Based on the recommendation data, the person could more quickly begin (or escalate) additional attack response techniques, such as proactively taking additional components of the target computing system offline, sending alert data to additional users of the target computing system, or contacting law enforcement. In some cases, the recommendation data could describe specific protective actions with relatively high value for the person who is experiencing stress during the attack, such as providing contact information for relevant law enforcement agencies, a telephone script to begin a report to law enforcement, template email or text message language to alert the additional users of the target computing systems, or other data describing recommended actions to reduce negative impacts of the attack.

The following examples are provided to introduce certain embodiments of the present disclosure. In the example implementation, a negotiation evaluation system determines that a target computing system is experiencing a computing system attack, such as a ransomware attack. The negotiation evaluation system determines a set of attack characteristics describing the ransomware attack. The set of attack characteristics could include characteristics of software used to initiate the ransomware attack (e.g., a malware type), characteristics of a malicious party associated with the attack, characteristics of a targeted organization associated with the target computing system that is being attacked, or other characteristics related to the ransomware attack. A negotiation estimation model included in the negotiation evaluation system determines response value data based on the set of attack characteristics. The response value data describes one or more potential responses to the ransomware attack, such as response options that are estimated to provide efficient resolution for the attack. The response value data could include data values describing a range of potential ransom payments, a data value indicating whether negotiation is likely to be successful, or other data values describing other potential response options or outcomes of response options. Based on the response value data, a negotiation communication model included in the negotiation evaluation system generates reply text data that includes a communication to a malicious computing system associated with the computing system attack. In some cases, the negotiation evaluation system provides the reply text data to the malicious computing system.

In this example, a risk estimation model included in the example negotiation evaluation system receives the attack characteristics. The risk estimation model can provide, such as to the negotiation estimation model or the negotiation communication model, risk data that estimates one or more risks associated with the computing system attack, such as a probability of experiencing a repeat attack, a probability of losing data (e.g., data that is interrupted by the attack), an estimation of elapsed time before attack resolution, or other data values describing risks associated with the attack. The risk data could be provided as an additional input to the negotiation estimation model or the negotiation communication model. In addition, a profile generation model included in the example negotiation evaluation system receives the attack characteristics. The profile generation model can provide, such as to the negotiation estimation model, the risk estimation model, or the negotiation communication model, archetype profile data that describes one or more traits that are associated with a participant in the ransomware attack, such as a trait of the targeted organization or a trait of the malicious party. The archetype profile data could be provided as an additional input to the negotiation estimation model, the risk estimation model, or the negotiation communication model.

As used herein, the term "computing system attack" or "attack" refers to one or more techniques performed by a malicious party to interrupt computing systems for a targeted entity, such that the malicious party expects to extract gain (e.g., a financial payment, sale of compromised data) from the targeted entity in exchange for restoration of the interrupted computing systems. For example, a ransomware attack could involve techniques to interrupt access to one or more portions of a computing network, such as encrypting a datastore, placing an authentication cordon around a network portion, or other types of interruption techniques.

As used herein, "computing system attacks" or "attacks" do not necessarily include physical harm to a targeted entity, although some types of attacks (e.g., interruptions to a keycard-entry system for a building) may have physical effects on the targeted entity.

Certain embodiments described herein provide improved technical tools for resolving computing system attacks. For example, a negotiation evaluation system can utilize particular rules to efficiently identify characteristics about an attack that is underway and determine one or more attack resolution options. The utilization of the particular rules can generate new or additional data objects—e.g., negotiation response data, a negotiation estimation model, a negotiation communication model—that can identify one or more attack resolution options with increased efficiency, such as compared to a person who is utilizing contemporary technical tools for computing system security. In addition, the negotiation evaluation system can identify characteristics of the attack and determine the attack resolution options with increased accuracy, as compared to contemporary technical tools for computing system security. In some cases, the negotiation evaluation system can improve outcomes for a targeted individual or organization, including improved technical outcomes such as reduced loss of data or decreased downtime or improved personal outcomes for one or more people who are affected by the attack, such as reducing stress, financial loss, or reputational loss for a person who is targeted or associated with a targeted organization.

Referring now to the drawings, FIG. 1 is a diagram depicting an example of a computing environment 100, in which a negotiation evaluation system 120 generates one or more types of negotiation response data, such as negotiation response data 125. The computing environment 100 can include one or more computing systems that may become targets of a computing system attack, such as a target computing system 110. In the computing environment 100, the target computing system 110 is operated by, or otherwise associated with, one or more targeted entities, which can include an individual, a non-profit organization, a company, a governmental agency, or other types of entities that can be targeted by a computing system attack. In FIG. 1, the one or more targeted entities associated with the target computing system 110 may desire to reduce negative outcomes that result from being targeted in a computing system attack, such as loss of data, loss of computing systems, reduced productivity, financial loss (e.g., ransom payment, costs to replace compromised systems), reputational loss, or other types of negative outcomes. FIG. 1 depicts the target computing system 110 as being a particular computing system, but other implementations are possible, such as a group of multiple computing systems that are collectively targeted by a computing system attack.

In addition, the computing environment 100 can include one or more computing systems that may implement a computing system attack, such as a malicious computing system 190. In the computing environment 100, the malicious computing system 190 is operated by, or otherwise associated with, one or more malicious parties, which can include an individual, a criminal organization, a company, a governmental agency, or other types of entities that can organize or perform a computing system attack. In FIG. 1, the one or more malicious parties associated with the malicious computing system 190 may desire to extract gain from organizing a computing system attack, such as financial gain (e.g., ransom payments, selling compromised data, selling compromised network access credentials), reputational gain (e.g., publishing compromised data, publishing names of attack targets), or other types of gain. FIG. 1 depicts the malicious computing system 190 as being a particular computing system, but other implementations are possible, such as a group of multiple computing systems that collectively participate in a computing system attack. In some cases, a malicious party that organizes a computing system attack may utilize multiple computing systems for various aspects of the attack (including, in some cases, utilization without permission of a computing system owner). For instance, the example malicious party could use a first computing system configured to launch the attack, a second computing system that provides a website or other portal configured to exchange communications with targeted entities, a third computing system configured to implement threats against targeted entities (e.g., publishing some or all compromised data), a fourth computing system configured to receive payments from targeted entities, or additional computing systems configured for additional attack aspects. In some cases, one or more of the multiple computing systems utilized by the example malicious party are third-party computing systems, e.g., providing services that are not under operational control of the malicious party or a targeted entity. For instance, the example fourth computing system configured to receive payments may be operated by a third party that provides payment processing services for any user, including users who are unassociated with the example computing system attack. In this example, the example fourth computing system may be considered associated with the computing system attack as a payment processor for the malicious party, although the example fourth computing system may also provide services to additional parties (e.g., non-malicious) that are not involved with the example attack.

In the computing environment 100, the negotiation evaluation system 120 includes one or more of a negotiation estimation model 130, a risk estimation model 140, a negotiation communication model 150, or a profile generation model 160. In addition, the negotiation evaluation system 120 generates the negotiation response data 125 based on data generated by (or otherwise received from) one or more of the models 130, 140, 150, or 160. For example, the negotiation estimation model 130 is configured to calculate response value data 135. In addition, the risk estimation model 140 is configured to calculate risk data 145. Furthermore, the negotiation communication model 150 is configured to generate text data, such as reply text data 155. In some cases, the profile generation model 160 is configured to generate archetype profile data 165. In the negotiation evaluation system 120, the negotiation response data 125 can include some or all of the response value data 135 generated by the negotiation estimation model 130, the risk data 145 generated by the risk estimation model 140, the reply text data 155 generated by the negotiation communication model 150, or the archetype profile data 165 generated by the profile generation model 160. FIG. 1 depicts the each of the models 130, 140, 150, and 160 as being included in the negotiation evaluation system 120, but other implementations are possible. For example, a negotiation evaluation system could be configured to communicate with one or more additional computing systems that can implement one or more of a negotiation estimation model, a risk estimation model, a negotiation communication model, or a profile generation model, or otherwise provide one or more portions of negotiation response data to the negotiation evaluation system.

In some cases, the computing environment 100 includes one or more data repositories, such as a computing system attack data repository 105. The computing system attack data repository 105 can include data that describes additional computing system attacks, such as historical data describing previous computing system attacks, statistical data describing various types of computing system attacks, or other data that describes computing system attacks. In some cases, the computing system attack data repository 105 can include data generated by the negotiation evaluation system 120, such as internal data describing additional computing system attacks handled by the negotiation evaluation system 120. In addition, the computing system attack data repository 105 can include data generated by one or more additional computing systems, such as computing system attack data provided by government agencies, cybersecurity (e.g., "watchdog") organizations, or additional organizations that compile or otherwise provide information about computing system attacks. In some cases, the negotiation evaluation system 120 can utilize data from the computing system attack data repository 105 to train one or more of the models 130, 140, 150, or 160. In addition, one or more of the models 130, 140, 150, or 160 could utilize data from the computing system attack data repository 105 to generate the response value data 135, the risk data 145, the reply text data 155, the archetype profile data 165, or other types of data used by the negotiation evaluation system 120. In some cases, the negotiation evaluation system 120 modifies the computing system attack data repository 105, such as including additional data describing an additional computing system attack that is handled by the negotiation evaluation system 120. For example, the negotiation evaluation system 120 could modify the computing system attack data repository 105 to include one or more archetype profile data objects generated by the profile generation model 160. FIG. 1 depicts the computing system attack data repository 105 as being included in the negotiation evaluation system 120, but other implementations are possible. For example, a negotiation evaluation system could be configured to receive data from one or more data repositories that are external to the negotiation evaluation system, or from a combination of internal and external data repositories.

In FIG. 1, the target computing system 110 includes one or more of a secure communication module 113 or a datastore 117. In some cases, the datastore 117 includes data related to one or more operations of the target computing system 110, such as configuration data for a website provided by the target computing system 110, customer data describing orders or other information for users of the example website, or additional data for other operations or services provided by the target computing system 110. In some cases, the secure communication module 113 is configured to exchange data with the negotiation evaluation system 120. For example, the secure communication module 113 can provide one or more secured channels for communications between the target computing system 110 and the negotiation evaluation system 120. In some cases, the one or more secured channels for communications are utilized by the target computing system 110 and the negotiation evaluation system 120 during a computing system attack. For example, if the target computing system 110 is subjected to a particular type of computing system attack that interrupts most communications to or from the target computing system 110, the target computing system 110 and the negotiation evaluation system 120 can continue (or establish) communication via at least one of the secured channels provided by the secure communication module 113. In some cases, the target computing system 110 and the negotiation evaluation system 120 could utilize the secure communication module 113 to exchange data during an attack. For example, the negotiation evaluation system 120 could provide a data request to the target computing system 110 via the secure communication module 113, such as a request for data about computing systems impacted by the attack, affected data records, whether the targeted entity has contacted law enforcement yet, or other requests for data about the attack. In addition, the target computing system 110 could provide response data to the negotiation evaluation system 120 via the secure communication module 113, such as a response to the data request or other response data related to the attack.

In the computing environment 100, the malicious computing system 190 performs one or more computing system attacks against the target computing system 110. The one or more computing system attacks can include interruptions (e.g., authentication lockout, encryption, network reconfiguration) to one or more portions of the target computing system 110. For instance, the one or more computing system attacks could encrypt some or all of the datastore 117, such that the targeted entity is unable to access the encrypted portion of the datastore 117. The negotiation evaluation system 120 may receive alert data 115 indicating that the target computing system 110 is being targeted by the computing system attacks. In some cases, the alert data 115 is generated by or received from the target computing system 110, such as via the secure communication module 113. In some cases, the negotiation evaluation system 120 generates the alert data 115 or receives the alert data 115 from an additional computing system. For example, the negotiation evaluation system 120 may determine that the target computing system 110 is experiencing an interruption in operations, e.g., based on changes in data provided from or received by the target computing system 110. In addition, the negotiation evaluation system 120 could generate the alert data 115 (or additional alert data indicating a computing system attack) responsive to determining the interruption in operations.

Responsive to determining that the target computing system 110 is being targeted by the one or more computing system attacks, the negotiation evaluation system 120 determines a set of characteristics of the one or more computing system attacks, such as a set of attack characteristics 127. Examples of attack characteristics can include characteristics of malware (or other software) used to initiate the attack, characteristics of one or more computing systems associated with the attack (e.g., the malicious computing system 190, the target computing system 110), characteristics of the malicious party, characteristics of the targeted entity, or other characteristics related to the computing system attack. In some cases, the negotiation evaluation system 120 determines the set of attack characteristics 127 based on one or more of the alert data 115, data (e.g., response data) received via the secure communication module 113, or additional data associated with the attacks against the target computing system 110. For example, the negotiation evaluation system 120 could provide data configuring a webform, chat interface, or other communication interface that is configured to request information about the attack, the target computing system 110, the targeted entity associated with the target computing system 110, or other information about potential attack characteristics. In some cases, the target computing system 110 receives the communication interface data, e.g., via the secure communication module 113. In addition, one or more additional computing systems associated with the targeted entity could receive the communication interface data, such as at a computing system that is not known to be compromised by the attack. In some cases, the negotiation evaluation system 120 could receive, via the example communication interface, additional data (e.g., response data) that can be used to determine one or more characteristics in the set of attack characteristics 127.

In FIG. 1, the negotiation evaluation system 120 provides one or more characteristics from the set of attack characteristics 127 to one or more of the models 130, 140, 150, or 160. Based on the one or more characteristics from the set of attack characteristics 127, the models 130, 140, 150, or 160 can generate one or more portions of the negotiation response data 125. For example, the risk estimation model 140 can generate one or more values in the risk data 145 based on the set of attack characteristics 127. The risk data values can describe risks associated with the one or more computing system attacks performed by the malicious computing system 190, such as a risk of attack recurrence, a risk of data publication (e.g., as retaliation by the malicious parties for refusal to pay ransom), or other types of risks associated with the attacks by the malicious computing system 190.

In addition, the profile generation model 160 can generate or otherwise determine the archetype profile data 165 based on the set of attack characteristics 127. The archetype profile data 165 can describe one or more traits that are associated with a participant in the one or more computing system attacks performed by the malicious computing system 190, such as traits that are associated with the malicious party or the targeted entity. For example, the profile generation model 160 can identify, from the set of attack characteristics 127, that the malicious computing system 190 is performing a particular type of ransomware attack. Responsive to identifying the characteristic of the particular ransomware attack, the profile generation model 160 can identify (or generate) first archetype profile data indicating that the particular ransomware attack is typically organized by a malicious party that is of relatively small size (e.g., 1-10 individuals), operates from a particular geographical region, and has a history (e.g., from prior attacks) of accepting ransom payments that are relatively low (e.g., $1000-$10,000). In addition, the profile generation model 160 can identify, from the set of attack characteristics 127, that the target computing system 110 provides a particular type of computing service (e.g., operates a retail website). Responsive to identifying the characteristic of the particular type of computing service, the profile generation model 160 can identify (or generate) second archetype profile data indicating that attack target entities providing the particular type of computing service typically are of relatively medium size (e.g., 100-500 employees), have a datastore that includes a relatively sensitive type of data (e.g., customer records, shipping addresses, credit card information), and that the type of data has a relatively high value (e.g., $100,000-$300,000 if sold via a dark-market website). In some cases, the profile generation model 160 can generate some or all of the archetype profile data 165 (e.g., during the computing system attacks), such as by performing a high-speed search of the computing system attack data repository 105 for information related to one or more particular attack characteristics from the set 127 and generating a portion of archetype profile data 165 based on result data from the high-speed search. In addition, the profile generation model 160 can identify some or all of the archetype profile data 165 from one or more archetype profile data objects (e.g., generated prior to the computing system attacks), such as by comparing the archetype profile data objects with the set of attack characteristics 127. In some cases, the profile generation model 160 can modify, e.g., during the computing system attacks, the identified or generated archetype profile data 165, such as by applying machine learning techniques to modify a particular profile trait based on a particular attack characteristic.

In addition, the negotiation estimation model 130 can generate the response value data 135 based on the set of attack characteristics 127. In some cases, the negotiation estimation model 130 generates the response value data 135 based on a combination of additional data with the set of attack characteristics 127, such as one or more of the risk data 145 or the archetype profile data 165. The response value data 135 can include data values that describe an estimated efficient response to the one or more computing system attacks performed by the malicious computing system 190, such as such as a Boolean data value that indicates whether negotiation is likely to resolve the attacks successfully, one or more numeric data values indicating a range of potential ransom payments, or other types of data values that describe an estimated efficient response to the attacks by the malicious computing system 190.

Further, the negotiation communication model 150 can generate the reply text data 155 based on the response value data 135 generated by the negotiation estimation model 130. In some cases, the negotiation communication model 150 generates the reply text data 155 based on a combination of additional data with the response value data 135, such as one or more of the set of attack characteristics 127, the risk data 145, or the archetype profile data 165. The reply text data 155 includes text data that responds to a communication received from the malicious computing system 190, such as natural language text data that replies to a question, demand, threat, or other type of received communication. For example, the target computing system 110 could receive communication data from the malicious computing system 190, such as communication text data 195. The communication text data 195 could describe a demanded payment amount in exchange for restoring access to the encrypted portion of the datastore 117. Based on the communication text data 195 and the response value data 135 (or combination of the response value data 135 with additional data), the negotiation communication model 150 generates the reply text data 155 that responds to the communication text data 195, such as a response indicating a counteroffer payment identified from the response value data 135.

In the computing environment 100, the negotiation evaluation system 120 provides the reply text data 155 to the target computing system 110, such as via the secure communication module 113. In addition, the reply text data 155 is provided to the malicious computing system 190. In some cases, the target computing system 110 provides the reply text data 155 to the malicious computing system 190, such as via a website or chat interface provided by the malicious computing system 190. In some cases, the negotiation evaluation system 120 provides the reply text data 155 to the malicious computing system 190. For example, the negotiation evaluation system 120 could establish a negotiation communication channel with the malicious computing system 190, such as via the secure communication module 113. In some cases, the negotiation communication channel may appear (e.g., to the malicious computing system 190) to originate from the target computing system 110, such that data exchanged via the negotiation communication channel appears to be exchanged between the malicious computing system 190 and the target computing system 110, without appearing to involve the negotiation evaluation system 120. In response to receiving additional communication text data from the malicious computing system 190, e.g., an additional demand or threat, the negotiation evaluation system 120 may perform additional operations responsive to the additional communication text data, such as generating additional portions of the negotiation response data 125 via one or more of the models 130, 140, 150, or 160. In some cases, the negotiation evaluation system 120 continues to generate and provide additional portions of the negotiation response data 125 until the encrypted portion of the datastore 117 is decrypted, communications from the malicious computing system 190 cease, or other events indicating resolution of the one or more computing system attacks.

In some cases, the negotiation evaluation system 120 provides one or more additional portions of the negotiation response data 125 to the target computing system 110, such as via the secure communication module 113. For example, the negotiation evaluation system 120 may provide to the target computing system 110 one or more of the response value data 135, the risk data 145, the archetype profile data 165, or the set of attack characteristics 127. In addition, the secure communication module 113 (or another component of the target computing system 110) may be configured to present one or more portions of the negotiation response data 125 via a user interface device of the target computing system 110. For example, the secure communication module 113 present, e.g., via a video or audio user interface device, one or more of the reply text data 155, the response value data 135, the risk data 145, the archetype profile data 165, or the set of attack characteristics 127. In some cases, a person who is associated with the targeted entity could view (or otherwise receive) the presented portions of the negotiation response data 125. In addition, receiving the presented portions of the negotiation response data 125 could help the person increase understanding of the computing system attacks, traits of the malicious party organizing the attacks, or potential options to resolve the attacks. In some cases, the negotiation evaluation system 120 can be configured to receive confirmation data from the target computing system 110, such as confirmation data that describes an approval of the reply text data 155 or additional portions of the negotiation response data 125. In addition, the negotiation evaluation system 120 could be configured to send the reply text data 155 to the malicious computing system 190 responsive to receiving the confirmation data, such as upon receiving approval (e.g., approval by the person associated with the target computing system 110) of a negotiation option described in the reply text data 155.

In some cases, the negotiation evaluation system 120 could perform one or more additional techniques during, or subsequent to, the one or more computing system attacks. For example, the negotiation evaluation system 120 could generate additional text data associated with the computing system attacks, efforts performed to resolve the attacks, or other aspects of the computing system attacks. In addition, the negotiation evaluation system 120 could provide the data one or more additional computing systems, such as one or more additional computing systems indicated by the target computing system 110 or determined by the negotiation evaluation system 120. For example, the negotiation evaluation system 120 could identify additional computing systems associated with a law enforcement organization, an information technology department of the targeted organization, a legal representative for the targeted organization, a regulatory agency that requires reporting of computing system attacks, or other indicated parties. In addition, the negotiation evaluation system 120 could generate or transmit data to one or more of the additional computing systems, such as reporting data to alert the indicated parties about the attack.

In some cases, the negotiation evaluation system 120 could exchange, such as with the malicious computing system 190, data related to payment. For example, the targeted organization associated with the target computing system 110 could elect a negotiation option that includes paying a ransom fee. In addition, the negotiation evaluation system 120 could perform one or more techniques related to receiving a payment amount from the targeted organization, converting the payment amount (e.g., conversion to/from a digital currency), or providing the payment amount (or converted payment amount) to the malicious computing system 190 (or another computing system associated with the computing system attacks). In some cases, the negotiation evaluation system 120 could provide to the target computing system 110 (or another computing system associated with the targeted organization) data associated with the computing system attacks, such as data analyzing the attack events, a determined avenue of infection (e.g., for malware which triggered the attacks), security suggestions to reduce a likelihood of additional attacks, or other types of data describing the computing system attacks.

FIG. 2 is a flow chart depicting an example of a process 200 for generating negotiation response data. In some embodiments, such as described in regards to FIG. 1, a computing device executing a negotiation evaluation system implements operations described in FIG. 2, by executing suitable program code. For illustrative purposes, the process 200 is described with reference to the examples depicted in FIG. 1. Other implementations, however, are possible.

At block 210, the process 200 involves receiving, by a negotiation evaluation system, alert data indicating at least one computing system attack, such as a ransomware attack. The alert data can indicate that the computing system attack is against a target computing system. In some cases, the negotiation evaluation system receives the alert data from the target computing system. In some cases, the negotiation evaluation system generates the alert data, such as based on additional data (e.g., indicating an interruption in operations) received from the target computing system or one or more additional computing systems. For example, the negotiation evaluation system 120 can receive (or generate) the alert data 115 indicating that the target computing system 110 is experiencing a computing system attack. In addition, the alert data 115 could indicate that the computing system attack originates from (or is otherwise associated with) the malicious computing system 190.

At block 220, the process 200 involves determining, by the negotiation evaluation system, a set of one or more attack characteristics associated with the computing system attack. In some cases, the negotiation evaluation system determines the set of attack characteristics based on one or more of the alert data, response data from the target computing system (e.g., responding to a data request from the negotiation evaluation system), or additional data associated with the computing system attack. For example, the negotiation evaluation system 120 generates (or otherwise determines) the set of attack characteristics 127 based on the alert data 115 or additional data associated with the computing system attack. In some cases, the set of attack characteristics can describe one or more of the computing system attack (e.g., the currently occurring attack), a type of the computing system attack, additional computing system attacks (e.g., prior instances of the attack type), the target computing system, a targeted entity associated with the target computing system, a malicious computing system that originates (or is otherwise associated with) the computing system attack, a malicious party associated with the computing system attack (or attack type), additional target computing systems or targeted entities affected by the type of computing system attack, additional malicious computing systems or malicious parties associated with the type of computing system attack, or other characteristics associated with the computing system attack.

In some cases, the negotiation evaluation system generates one or more attack characteristics included in the set, such as by generating characteristics based on the alert data or additional data. In addition, the negotiation evaluation system can identify one or more attack characteristics included in the set from an additional data source, such as a repository of attack characteristics. For example, the set of attack characteristics 127 can include one or more attack characteristics generated by the negotiation evaluation system 120, such as based on the alert data 115. In addition, the set of attack characteristics 127 can include one or more attack characteristics identified by the negotiation evaluation system 120, such as from characteristics stored in the computing system attack data repository 105 or provided by one or more additional computing systems (e.g., characteristics provided by a cybersecurity watchdog organization).

At block 230, the process 200 involves providing one or more of the characteristics from the set of attack characteristics to a trained negotiation estimation model that is included in (or otherwise associated with) the negotiation evaluation system. For example, the trained negotiation estimation model is configured to generate response value data that describes the computing system attack, such as one or more data values that describe an estimated efficient response to the computing system attack. In some cases, the trained negotiation estimation model generates the response value data based on one or more of the characteristics from the set of attack characteristics. For example, the negotiation estimation model 130 could generate the response value data 135 based on the set of attack characteristics 127. In addition, the trained negotiation estimation model could generate the response value data based on a combination of data, such as a combination of the set of attack characteristics with risk data generated by a trained risk estimation model, archetype profile data generated by a trained profile generation model, or additional data received by the trained negotiation estimation model. For example, the negotiation estimation model 130 could generate the response value data 135 based on the set of attack characteristics 127 combined with one or more of the risk data 145, the archetype profile data 165, or additional data accessible by the negotiation estimation model 130. In some cases, one or more of the trained negotiation estimation model, the trained risk estimation model, or the trained profile generation model are configured to generate respective data utilizing one or more machine learning techniques, such as nearest neighbor, k-nearest neighbor ("KNN"), support vector machines ("SVM"), artificial neural network ("ANN"), or other machine learning techniques.

At block 240, the process 200 involves receiving the response value data generated by the trained negotiation estimation model. In some cases, the negotiation evaluation system receives the response value data that is determined by the trained negotiation estimation model based on the set of attack characteristics. In addition, the negotiation evaluation system could generate or modify negotiation response data based on the response value data. For example, the negotiation evaluation system 120 generates or modifies the negotiation response data 125 to include some or all of the response value data 135.

At block 250, the process 200 involves providing the response value data to a trained negotiation communication model that is included in (or otherwise associated with) the negotiation evaluation system. In some cases, the trained negotiation communication model is configured to generate text data utilizing one or more machine learning techniques, such as natural language processing ("NLP"), natural language understanding ("NLU"), natural language generation ("NLG"), large language models ("LLM") or other machine learning techniques. For example, the trained negotiation communication model is configured to generate reply text data, such as natural language text data that responds to a communication received from a malicious party associated with the computing system attack. In some cases, the trained negotiation communication model generates the reply text data based on the response value data. For example, the negotiation communication model 150 could generate the reply text data 155 based on the response value data 135. In addition, the trained negotiation communication model could generate the reply text data based on a combination of data, such as a combination of the response value data with the set of attack characteristics, risk data generated by a risk estimation model, archetype profile data generated by a profile generation model, or additional data received by the trained negotiation communication model. For example, the negotiation communication model 150 could generate the reply text data 155 based on the response value data 135 combined with one or more of the set of attack characteristics 127, the risk data 145, the archetype profile data 165, or additional data accessible by the negotiation communication model 150.

At block 260, the process 200 involves receiving the reply text data generated by the trained negotiation communication model. In some cases, the negotiation evaluation system receives the reply text data that is determined by the trained negotiation communication model based on the response value data. In addition, the negotiation evaluation system could generate or modify negotiation response data based on the reply text data. For example, the negotiation evaluation system 120 generates or modifies the negotiation response data 125 to include some or all of the reply text data 155.

At block 270, the process 200 involves providing, by the negotiation evaluation system, some or all of the reply text data. In some cases, the negotiation evaluation system could provide the reply text data to the malicious computing system associated with the computing system attack against the target computing system. In addition, the negotiation evaluation system could provide the reply text data to the target computing system. In some cases, the negotiation evaluation system provides the reply text data via one or more secure communication channels. For example, the negotiation evaluation system 120 provides the reply text data 155 to the malicious computing system 190 via the secure communications module 113.

In some cases, the process 200 involves providing one or more of the characteristics from the set of attack characteristics to one or more additional trained models included in (or otherwise associated with) the negotiation evaluation system. For example, the negotiation evaluation system could include a trained risk estimation model that is configured to generate risk data that describes risks associated with the computing system attack. In addition, the negotiation evaluation system could include a trained profile generation model that is configured to generate archetype profile data that describes one or more traits associated with the computing system attack, the target computing system (or an associated target party), the malicious computing system (or an associated malicious party), or other traits of the computing system attack or attack participants. In some cases, one or more of the risk data or the archetype profile data is received by the negotiation estimation model or the negotiation communication model included in the negotiation evaluation system. In addition, the negotiation estimation model or the negotiation communication model can respectively generate the response value data or the reply text data based on the risk data or the archetype profile data. For example, the negotiation estimation model 130 can generate the response value data 135 based on a combination of the set of attack characteristics 127 with one or more of the risk data 145 or the archetype profile data 165. In addition, the negotiation communication model 150 can generate the reply text data 155 based on a combination of the response value data 135 with one or more of the set of attack characteristics 127, the risk data 145, or the archetype profile data 165.

In some cases, one or more models included in a negotiation evaluation system are trained to provide portions of negotiation response data. For example, one or more of the models could be trained via machine learning techniques or other suitable training techniques. FIG. 3 is a diagram depicting an example of a computing environment 300 in which one or more models included in an negotiation evaluation system 320 are trained to generate data, such as portions of negotiation response data 325. The computing environment 300 includes the negotiation evaluation system 320. In addition, the computing environment 300 includes one or more data repositories that store computing system attack data, such as a computing system attack data repository 305a and a computing system attack data repository 305b (collectively referred to herein as computing system attack data repositories 305). The computing system attack data repositories 305 include data associated with computing system attacks, such as historical data describing previous computing system attacks, statistical data describing various types of computing system attacks, or other data associated with computing system attacks.

In some cases, one or more of the computing system attack data repositories 305 includes computing system attack data that is generated by one or more computing systems external to the negotiation evaluation system 320. For example, the data repository 305a could include external computing system attack data that is provided by additional computing systems associated with one or more of government agencies (e.g., law enforcement agencies, cybersecurity research/policy offices), non-profit organizations (e.g., cybercrime watchdog organizations, standards organizations, multi-member industry alliances), academic institutions, businesses (e.g., cybersecurity consulting businesses), or other types of organizations that provide information about ransomware or other types of computing system attacks. FIG. 3 depicts the data repository 305a as a particular data storage system, but other implementations are possible, such as multiple data repositories operated by (or otherwise associated with) multiple providers of computing system attack data. In some cases, the data repository 305a could include computing system attack data that is publicly available, such as statistical data, provided by a government agency, threat alerts provided by a cybersecurity watchdog organization, or other types of computing system attack data that are released publicly. In some cases, the data repository 305a could include computing system attack data that is available privately, such as data analysis that is provided (e.g., to an organization associated with the negotiation evaluation system 320) as a product by a cybersecurity consulting business.

In addition, the data repository 305b could include computing system attack data that is generated by the negotiation evaluation system 320. For example, the data repository 305b could include internal computing system attack data, such as data associated with historical computing system attacks handled by the negotiation evaluation system 320. In some cases, the data repository 305b includes internal computing system attack data that is anonymized, aggregated, or otherwise altered to omit identification of one or more targeted organizations associated with the historical computing system attacks. FIG. 3 depicts the data repository 305a as a particular data storage system, but other implementations are possible, such as multiple data repositories operated by (or otherwise associated with) the negotiation evaluation system 320. FIG. 3 depicts the negotiation evaluation system 320 as being configured to communicate externally with the computing system attack data repositories 305, but other implementations are possible. For example, a negotiation evaluation system could include one or more data repositories that are configured to receive data associated with historical computing system attacks handled by the example negotiation evaluation system, or to receive data provided from one or more additional computing systems (e.g., providers of external computing system attack data), or to receive additional types of computing system attack data.

In FIG. 3, the negotiation evaluation system 320 generates or modifies computing system attack training data 306. In some cases, the training data 306 is generated or modified based on computing system attack data from one or more of the data repositories 305. For example, the negotiation evaluation system 320 could identify, from the data repository 305a, one or more data sources describing a new variant for a particular type of computing system attack, such as a new variant of malware that is associated with a rise in ransomware attacks. Based on the data sources describing the new variant, the negotiation evaluation system 320 could modify (or generate) the training data 306 to describe the new variant. In addition, the negotiation evaluation system 320 could identify, from the data repository 305b, a subset of historical computing system attacks that have characteristics similar to characteristics described for the new variant. Responsive to identifying the subset of historical computing system attacks, the negotiation evaluation system 320 could modify the training data 306 to describe the new variant, such as by generating (or modifying) attack characteristics 327 to describe the characteristics of the subset.

In the computing environment 300, the negotiation evaluation system 320 includes one or more of a negotiation estimation model 330, a risk estimation model 340, a negotiation communication model 350, or a profile generation model 360. In some cases, the models 330, 340, 350, and 360 are configured to generate one or more portions of the negotiation response data 325. In addition, the negotiation evaluation system 320 is configured to train (or retrain) one or more of the models 330, 340, 350, or 360 based on the computing system attack training data 306 (or modified versions of the training data 306). For example, responsive to modifying the computing system attack training data 306 to include the attack characteristics 327 that are associated with the new variant, the negotiation evaluation system 320 could train (or retrain) one or more of the models 330, 340, 350, or 360. Based on the attack characteristics 327, the negotiation evaluation system 320 trains the negotiation estimation model 330 to calculate response value data 335. In addition, the negotiation evaluation system 320 trains the negotiation communication model 350 to generate text data, such as reply text data 355, based on the response value data 335. In some cases, the negotiation evaluation system 320 trains the risk estimation model 340 to calculate risk data 345 based on the attack characteristics 327. In some cases, the negotiation evaluation system 320 trains the profile generation model 360 to generate archetype profile data 365 based on the attack characteristics 327.

In some implementations, the negotiation evaluation system 320 could train (or retrain) one or more of the models 330, 340, 350, or 360 via machine learning techniques. For example, the negotiation communication model 350 can be trained to generate the reply text data 355 via one or more machine learning techniques to generate a text data portion of the negotiation response data 325, including techniques such as NLP, NLU, NLG, LLM, or other machine learning techniques for understanding or generating language. In addition, one or more of the negotiation estimation model 330, the risk estimation model 340, or the profile generation model 360 can be trained to generate respective portions of the negotiation response data 325 via one or more machine learning techniques, including techniques such as nearest neighbor, KNN, SVM, ANN, or other machine learning techniques for understanding or generating language. As an example, the profile generation model 360 could be trained to utilize KNN machine learning techniques to identify one or more traits that are associated with (e.g., included in a k-nearest neighbor set) one or more of the attack characteristics 327. As an additional example, the risk estimation model 340 could be trained to utilize SVM or ANN machine learning techniques to identify a probability range associated with a potential recurrence of a particular attack.

In some implementations, the negotiation evaluation system 320 trains multiple ones of the models 330, 340, 350, and 360 together, such as by providing a training output of a particular model as a training input for another particular model. For example, the negotiation evaluation system 320 could train the negotiation estimation model 330 to generate the response value data 335 based on a combination of the set of attack characteristics 327 with one or more of the risk data 345 or the archetype profile data 365. In addition, the negotiation evaluation system 320 could train the negotiation communication model 350 to generate the reply text data 355 based on a combination of the response value data 335 with one or more of the set of attack characteristics 327, the risk data 345, or the archetype profile data 365. In some cases, the negotiation evaluation system 320 implements additional training for one or more of the models 330, 340, 350, and 360. Examples of additional training can include ongoing training (e.g., real-time) that occurs in response to each additional attack handled by the negotiation evaluation system 320, periodic training that occurs at a particular time period (e.g., weekly, daily), batch training that occurs in response to receiving a particular amount of training data (e.g., upon receiving data related to n attacks), or other types of additional training.

Figure 4:
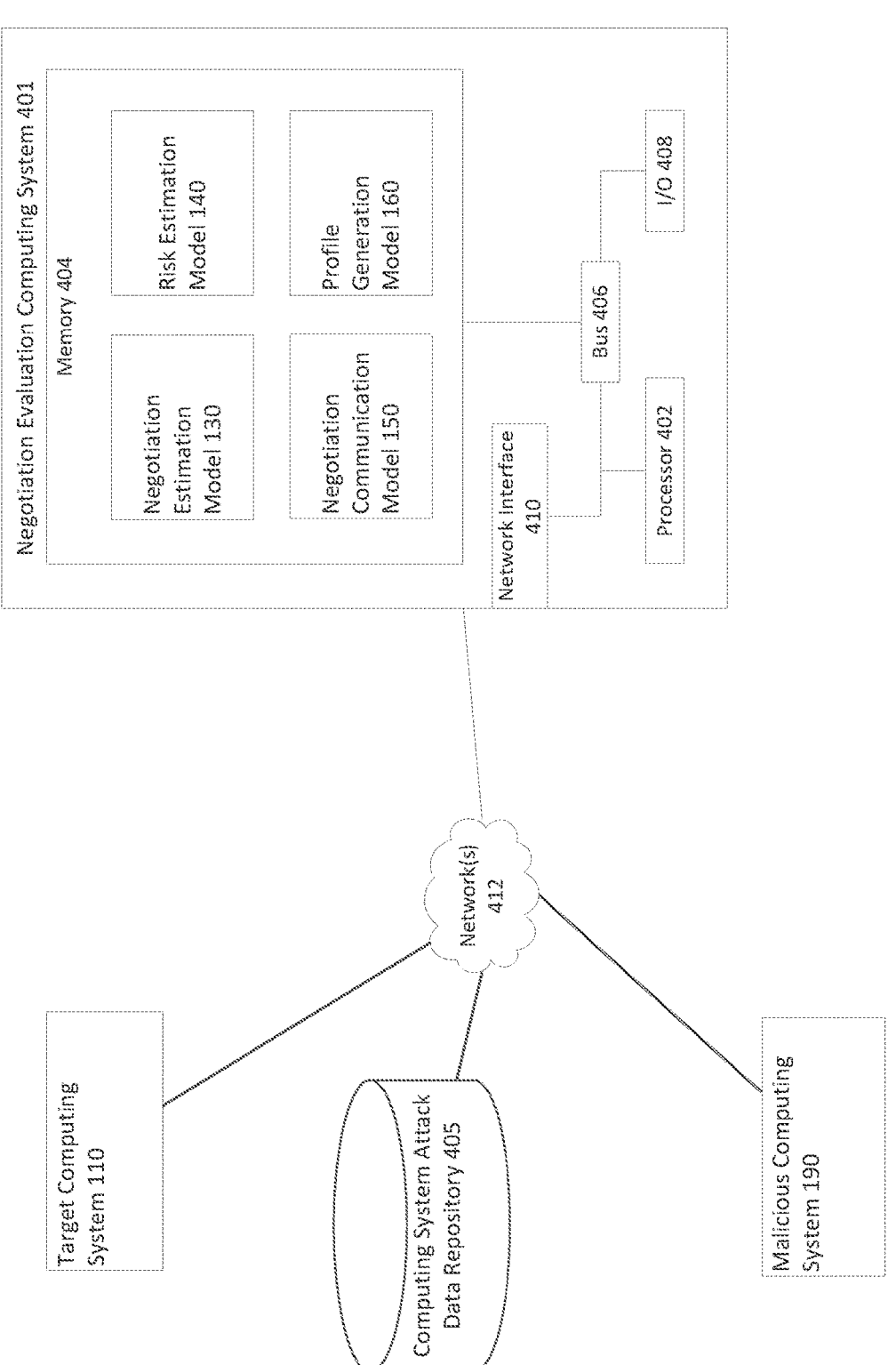
FIG. 4 is a block diagram depicting an example of a computing system for implementing a negotiation evaluation system, according to certain embodiments.

Any suitable computing system or group of computing systems can be used for performing the operations described herein. For example, FIG. 4 is a block diagram depicting a negotiation evaluation computing system 401, according to certain embodiments.

The depicted example of the negotiation evaluation computing system 401 includes one or more processors 402 communicatively coupled to one or more memory devices 404. The processor 402 executes computer-executable program code or accesses information stored in the memory device 404. Examples of processor 402 include a microprocessor, an application-specific integrated circuit ("ASIC"), a field-programmable gate array ("FPGA"), or other suitable processing device. The processor 402 can include any number of processing devices, including one.

The memory device 404 includes any suitable non-transitory computer-readable medium for storing the negotiation estimation model 130, the risk estimation model 140, the negotiation communication model 150, the profile generation model 160, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The negotiation evaluation computing system 401 may also include a number of external or internal devices such as input or output devices. For example, the negotiation evaluation computing system 401 is shown with an input/output ("I/O") interface 408 that can receive input from input devices or provide output to output devices. A bus 406 can also be included in the negotiation evaluation computing system 401. The bus 406 can communicatively couple one or more components of the negotiation evaluation computing system 401.

The negotiation evaluation computing system 401 executes program code that configures the processor 402 to perform one or more of the operations described above with respect to FIGS. 1-3. The program code includes operations related to, for example, one or more of the negotiation estimation model 130, the risk estimation model 140, the negotiation communication model 150, the profile generation model 160, or other suitable applications or memory structures that perform one or more operations described herein. The program code may be resident in the memory device 404 or any suitable computer-readable medium and may be executed by the processor 402 or any other suitable processor. In some embodiments, the program code described above, the negotiation estimation model 130, the risk estimation model 140, the negotiation communication model 150, and the profile generation model 160 are stored in the memory device 404, as depicted in FIG. 4. In additional or alternative embodiments, one or more of the negotiation estimation model 130, the risk estimation model 140, the negotiation communication model 150, the profile generation model 160, and the program code described above are stored in one or more memory devices accessible via a data network, such as a memory device accessible via a cloud service.

The negotiation evaluation computing system 401 depicted in FIG. 4 also includes at least one network interface 410. The network interface 410 includes any device or group of devices suitable for establishing a wired or wireless data connection to one or more data networks 412. Non-limiting examples of the network interface 410 include an Ethernet network adapter, a modem, and/or the like. At least one computing system attack data repository 405 is connected to the negotiation evaluation computing system 401 via network 412, and the computing system attack data repository 405 can perform some of the operations described herein, such as providing computing system attack data. The negotiation evaluation computing system 401 is able to communicate with one or more of computing system attack data repository 405, the target computing system 110, or the malicious computing system 190 using the network interface 410. Although FIG. 4 depicts the computing system attack data repository 405 as being connected to negotiation evaluation computing system 401 via the networks 412, other embodiments are possible, including one or more computing system attack data repositories running as a program in the memory 404 or being included as a data storage component of the negotiation evaluation computing system 401.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A system comprising:
a processor, and
a non-transitory computer-readable storage device storing instructions that are executable by the processor to:
receive, from a target computing system, alert data indicating a computing system attack against the target computing system;
responsive to receiving the alert data, determine a set of attack characteristics associated with the computing system attack;
provide the set of attack characteristics to a trained negotiation estimation model;
receive, from the trained negotiation estimation model, response value data that is determined by the trained negotiation estimation model based on the set of attack characteristics;
provide the response value data to a trained negotiation communication model;
receive, from the trained negotiation communication model, text data that includes a reply to the computing system attack, wherein the reply is based on the response value data; and
provide the text data to a malicious computing system that is associated with the computing system attack.

2. The system of claim 1, the instructions further executable by the processor to:
provide the set of attack characteristics to a trained risk estimation model;
receive, from the trained risk estimation model, risk data that comprises one or more risk data values associated with the computing system attack; and
provide the risk data to the trained negotiation estimation model, wherein the response value data is further determined by the trained negotiation estimation model based on the risk data.

3. The system of claim 2, the instructions further executable by the processor to:
provide the risk data to the target computing system, wherein the target computing system is configured to modify a user interface device based on the risk data.

4. The system of claim 2, wherein the risk data comprises one or more of: a probability of a recurrent computing system attack, an estimation of system compromise, an estimation of data compromise, or an estimation of damages caused by the computing system attack.

5. The system of claim 1, wherein the response value data comprises one or more of: a decision regarding an offer associated with the computing system attack, a numeric value for a counteroffer associated with the computing system attack, or a time frame for providing the text data to the malicious computing system.

6. The system of claim 1, the instructions further executable by the processor to:

receive, from a profile generation module, archetype profile data that is based on additional data associated with additional computing system attacks; and provide the archetype profile data to the trained negotiation estimation model, wherein the response value data is further determined by the trained negotiation estimation model based on the archetype profile data.

7. The system of claim 1, wherein providing the text data to the malicious computing system includes:

providing the text data to a communication module that is implemented via the target computing system; and configuring the communication module to provide the text data to the malicious computing system.

8. A method including operations executed by a processor, the operations comprising:

determining, based on alert data indicating an initiation of a computing system attack against a target computing system, a set of attack characteristics associated with the computing system attack against the target computing system;

receiving, from a trained negotiation estimation model, response value data that is determined by the trained negotiation estimation model based on the set of attack characteristics;

providing the response value data to a trained negotiation communication model;

receiving, from the trained negotiation communication model, text data that includes a reply to the computing system attack, wherein the reply is determined by the trained negotiation communication model based on the response value data; and providing the text data to a malicious computing system corresponding to the computing system attack.

9. The method of claim 8, the operations further comprising:

providing the set of attack characteristics to a trained risk estimation model;

receiving, from the trained risk estimation model, risk data that comprises one or more risk values associated with the computing system attack; and providing the risk data to the trained negotiation estimation model, wherein the response value data is further determined by the trained negotiation estimation model based on the risk data.

10. The method of claim 9, the operations further comprising:

providing the risk data to the target computing system, wherein the target computing system is configured to modify an output device based on the risk data.

11. The method of claim 9, wherein the risk data comprises one or more of: a probability of a recurrent computing system attack, an estimation of system compromise, an estimation of data compromise, or an estimation of damages caused by attack.

12. The method of claim 8, wherein the response value data comprises one or more of: a decision regarding an offer associated with the computing system attack, a numeric value for a counteroffer associated with the computing system attack, or a time frame for providing the text data to the malicious computing system.

13. The method of claim 8, the operations further comprising:

receiving, from a profile generation module, archetype profile data that is based on additional data associated with additional computing system attacks; and providing the archetype profile data to the trained negotiation estimation model, wherein the response value data is further determined by the trained negotiation estimation model based on the archetype profile data.

14. The method of claim 8, wherein providing the text data to the malicious computing system includes:

providing the text data to a communication application that is implemented via the target computing system; and configuring the communication application to provide the text data to the malicious computing system.

15. A non-transitory computer-readable medium embodying program code that, when executed by a processor, causes the processor to perform operations comprising:

determining, based on alert data indicating an initiation of a computing system attack against a target computing system, a set of attack characteristics associated with the computing system attack against the target computing system;

receiving, from a trained negotiation estimation model, response value data that is determined by the trained negotiation estimation model based on the set of attack characteristics;

providing the response value data to a trained negotiation communication model;

receiving, from the trained negotiation communication model, text data that includes a reply to the computing system attack, wherein the reply is determined by the trained negotiation communication model based on the response value data; and providing the text data to a malicious computing system corresponding to the computing system attack.

16. The non-transitory computer-readable medium of claim 15, the operations further comprising:

providing the set of attack characteristics to a trained risk estimation model;

receiving, from the trained risk estimation model, risk data that comprises one or more risk values associated with the computing system attack; and providing the risk data to the trained negotiation estimation model, wherein the response value data is further determined by the trained negotiation estimation model based on the risk data.

17. The non-transitory computer-readable medium of claim 16, wherein the risk data comprises one or more of: a probability of a recurrent computing system attack, an estimation of system compromise, an estimation of data compromise, or an estimation of damages caused by attack.

18. The non-transitory computer-readable medium of claim 15, wherein the response value data comprises one or more of: a decision regarding an offer associated with the computing system attack, a numeric value for a counteroffer associated with the computing system attack, or a time frame for providing the text data to the malicious computing system.

19. The non-transitory computer-readable medium of claim 15, the operations further comprising:

receiving, from a profile generation module, archetype profile data that is based on additional data associated with additional computing system attacks; and providing the archetype profile data to the trained negotiation estimation model, wherein the response value data is further determined by the trained negotiation estimation model based on the archetype profile data.

20. The non-transitory computer-readable medium of claim 15, wherein providing the text data to the malicious computing system includes:

providing the text data to a communication application that is implemented via the target computing system; and configuring the communication application to provide the text data to the malicious computing system.

* * * * *